Patented Aug. 16, 1927.

1,639,423

UNITED STATES PATENT OFFICE.

JOSEPH BLUMENFELD, OF LONDON, ENGLAND, ASSIGNOR TO BLUMANN RARE EARTHS CHEMICAL COMPANY, A CORPORATION OF DELAWARE.

PREPARATION OF PIGMENTS AND PAINTS.

No Drawing. Application filed April 22, 1926, Serial No. 103,972, and in Great Britain April 22, 1925.

This invention relates to the preparation of paints and pigments, particularly titanium pigments and paints prepared from such pigments as titanium oxide, that is having only a very feeble action if any at all upon the vehicles with which such pigments are generally mixed to form the paint.

It has previously been proposed to incorporate zinc oxide or other oxides with, for example, titanium oxide for use as a pigment on account of the action of the zinc oxide on the oil with which the pigment is mixed to form a paint, but although certain advantages result therefrom the quality of the paint is adversely affected by the large proportion of zinc oxide which it is found necessary to add, the opacity of the paint being seriously reduced.

The object of the present invention is the preparation of a pigment or paint which is free from the aforesaid objections while retaining the advantages resulting from the incorporation therein of such substances as the oxides or other salts of zinc or other compounds which have a similar action.

I have found that the desired result as regards action on the oil can be attained with the use of much smaller proportions of such substances as zinc oxide, by the incorporation in the pigment or paint of metallic peroxides or persalts.

Processes are known, however, in which dioxides (erroneously termed peroxides) such as those of lead or manganese are incorporated with various pigments but it is to be noted that in this specification the term "peroxides" is to be understood to mean the true or active peroxides, that is those substances capable of producing hydrogen peroxide on treatment with an acid. Similarly the term "persalts" is to be read as meaning true persalts which give rise to hydrogen peroxide by the action of acids.

The zinc oxide or the like may even be dispensed with, if desired, and the pigment made up only of the titanium oxide or other pigmentary substance, for example other rare earth oxygen compounds, having little or no action on linseed oil, together with a small proportion of metallic peroxide or persalt.

The invention accordingly consists in the incorporation with a pigment having little or no chemical action on linseed oil but capable of forming the opaque body of a paint of an oxidizing agent containing a metallic peroxide or persalt.

The invention further consists in the incorporation with a pigment of the kind indicated in the preceding paragraph of an oxidizing agent in the form of a metallic peroxide together with an alkaline substance such as a metallic oxide, hydroxide or carbonate, for example, of zinc, aluminium or magnesium.

The invention further consists in the application of the processes indicated in the two preceding paragraphs to pigments containing titanium oxide.

The invention further consists in the incorporation with a paint containing titanium oxide of barium peroxide.

The invention further consists in the incorporation with a pigment or paint containing titanium oxide of a mixture of barium peroxide and zinc oxide, hydroxide or carbonate.

The invention further consists in paints and pigments obtained by the methods herein described and in paints prepared therefrom.

Experiment shows that titanium oxide itself does not act chemically on linseed oil and it is advantageous to add to paints prepared with titanium oxide pigments such substances that are capable of acting chemically with the linseed oil. For example, I may add substances acting as oxidizing agents such as the peroxides or persalts of barium or strontium, alone or with the known alkaline substances such as zinc hydroxide capable of neutralizing the acid or acids present in the oil or forming therein.

In carrying the invention into effect in one form, taking by way of example a titanium pigment, the calcined titanium oxide is ground with water and during the grinding or subsequently a salt of zinc in solution is added and hydroxide of zinc is then precipitated by the addition of an alkali. Alternatively, a zincate in solution may be added instead of a zinc salt and the hydroxide of zinc precipitated by an acid. The hydroxide of zinc prepared by precipitation is preferred as it gives apparently an improved product. Instead of zinc hydroxide, zinc carbonate may be precipitated by the addition of a soluble alkali carbonate. By adding a mixture of suitable substances both the hydroxide and the carbonate of zinc may be precipitated. The product may be then subjected to a careful dehydration under such conditions as do not alter the state of division produced by the precipitation in the above method. A small proportion of barium peroxide, say 10 per cent, is added to the mixture before or after grinding with the linseed oil or even incorporated with the oil during grinding.

In carrying the invention into effect in another form, and taking by way of example a titanium pigment, the titanium oxide is mixed with a small proportion of barium peroxide as in the previous case; hydroxide or carbonate of zinc is prepared separately and added to the pigment either before or after drying and alternatively during the grinding with oil or even incorporated with the oil during the grinding operation. Similar results can be obtained by the incorporation of other metallic hydroxides or carbonates with the titanium pigment and the peroxide or persalt, for example, those of aluminium or magnesium, or other metals, which compounds have a similar action. The oxides of these metals prepared in a dry way and/or calcined may be used.

It is to be noted that the paints prepared in accordance with this invention have been found to withstand the action of atmospheric conditions, and that the paint film is of a satisfactory degree of hardness.

It is to be understood that the above-described methods of carrying the invention into effect have been given by way of example only as various modifications of the invention may be made without departing from the spirit of the invention. For example, a pigment, white or coloured, may consist of oxide of iron, graphite, or other substance having only a very feeble chemical action if any at all on the linseed oil, and the invention is equally applicable thereto.

Having now described my invention, what I claim as new and desire to secure by Letters Patent is:—

1. Process for the preparation of a coating material containing a compound of the type of titanium oxide and having covering power, but little, if any, action on the acids in paint vehicles, comprising adding to said coating materal a metallic oxygen compound capable of liberating hydrogen peroxide by reaction with the acid in said vehicles.

2. Process for the preparation of a coating material containing a titanium oxide pigment, comprising adding thereto a metallic oxygen compound capable of reacting with acids to liberate hydrogen peroxide.

3. Process for the preparation of a liquid coating material containing titanium oxide and linseed oil, comprising adding thereto with mixing a metallic oxygen compound capable of reacting with the acids in said oil to liberate hydrogen peroxide.

4. In the process for the preparation of a coating material containing titanium oxide, the step which comprises adding to titanium oxide an oxygen compound of one of the metals of the first two groups of the periodic system, said oxygen compound being capable of liberating hydrogen peroxide under the action of acid, and at least one other metallic compound to act as extender.

5. In the process of manufacturing coating material the steps which comprise precipitating a metallic oxygen compound from solution, into association with an inactive but highly pigmenting metallic oxygen compound, dehydrating the mixture and thereafter adding thereto with mixing a peroxide of one of the metals of the first two groups of the periodic system and a paint vehicle.

6. In the manufacture of coating materials containing titanium oxide pigments, the steps comprising mixing calcined titanium oxide with water and adding thereto an aqueous zinc solution, treating said solution to precipitate therefrom an oxygen compound of zinc into association with said titanium oxide, dehydrating the resulting mixture and thereafter adding thereto a small amount of barium peroxide and a paint vehicle.

7. The liquid coating material resulting from the association with a calcined pigmenting oxide and a vehicle, of a metallic oxide compound capable of producing hydrogen peroxide by reaction with acid present in said vehicle.

8. A coating material resulting from the association with a calcined titanium oxide compound, and another compound of lesser pigmenting power, of an oxygen compound of one of the metals of the first two groups of the periodic system, said last mentioned compound being capable of reacting with acid to liberate hydrogen peroxide.

9. A method of treating pigments or paints containing titanium oxide, comprising the incorporation therewith of peroxide of barium.

In testimony whereof I have signed my name to this specification.

JOSEPH BLUMENFELD.